United States Patent
Swanson et al.

[11] Patent Number: 6,145,395
[45] Date of Patent: Nov. 14, 2000

[54] SIDE LOAD COMPENSATED LINEAR ACTUATOR

[75] Inventors: Richard G. Swanson, West Hartford; James W. Haury, Simsbury; Todd C. Pannone, Colchester, all of Conn.

[73] Assignee: E-Drive Design, Inc., Glastonbury, Conn.

[21] Appl. No.: 09/232,971

[22] Filed: Jan. 19, 1999

[51] Int. Cl.[7] .......................... F16H 25/20; F16C 19/00
[52] U.S. Cl. ................................ 74/89.15; 74/424.8 R; 74/459; 384/55; 384/58
[58] Field of Search ........................ 74/89.15, 424.8 R, 74/459; 384/55, 57, 58

[56] References Cited

U.S. PATENT DOCUMENTS

| | | |
|---|---|---|
| 2,806,383 | 9/1957 | Geyer . |
| 3,113,807 | 12/1963 | Polidor ........................................ 384/49 |
| 3,793,918 | 2/1974 | Huffman ............................ 74/89.15 X |
| 4,075,898 | 2/1978 | Carlson, Jr. . |
| 4,500,805 | 2/1985 | Swanson . |
| 4,723,454 | 2/1988 | Periou et al. . |
| 4,821,456 | 4/1989 | Nogaki . |
| 5,340,247 | 8/1994 | Cuneo et al. ...................... 74/89.15 X |
| 5,370,012 | 12/1994 | Stanley . |
| 5,425,282 | 6/1995 | Luigs et al. ............................ 74/89.15 |
| 5,426,989 | 6/1995 | Uhlmann et al. . |
| 5,590,580 | 1/1997 | Nagai . |
| 5,634,376 | 6/1997 | Kitamura . |
| 5,722,304 | 3/1998 | Allen . |
| 5,747,896 | 5/1998 | Nagai et al. . |
| 5,761,960 | 6/1998 | Nagai et al. . |

*Primary Examiner*—Allan D. Herrmann
*Attorney, Agent, or Firm*—McCormick, Paulding & Huber LLP

[57] ABSTRACT

An internal side load compensation device for use with a linear actuator comprises at least one cam beam affixed to the actuator housing pre-loaded to a known side load to influence at least one cam roller affixed to the primary driver of the linear actuator. The cam beam is pre-loaded by adjusting pre-load bars extending within the actuator housing.

19 Claims, 4 Drawing Sheets

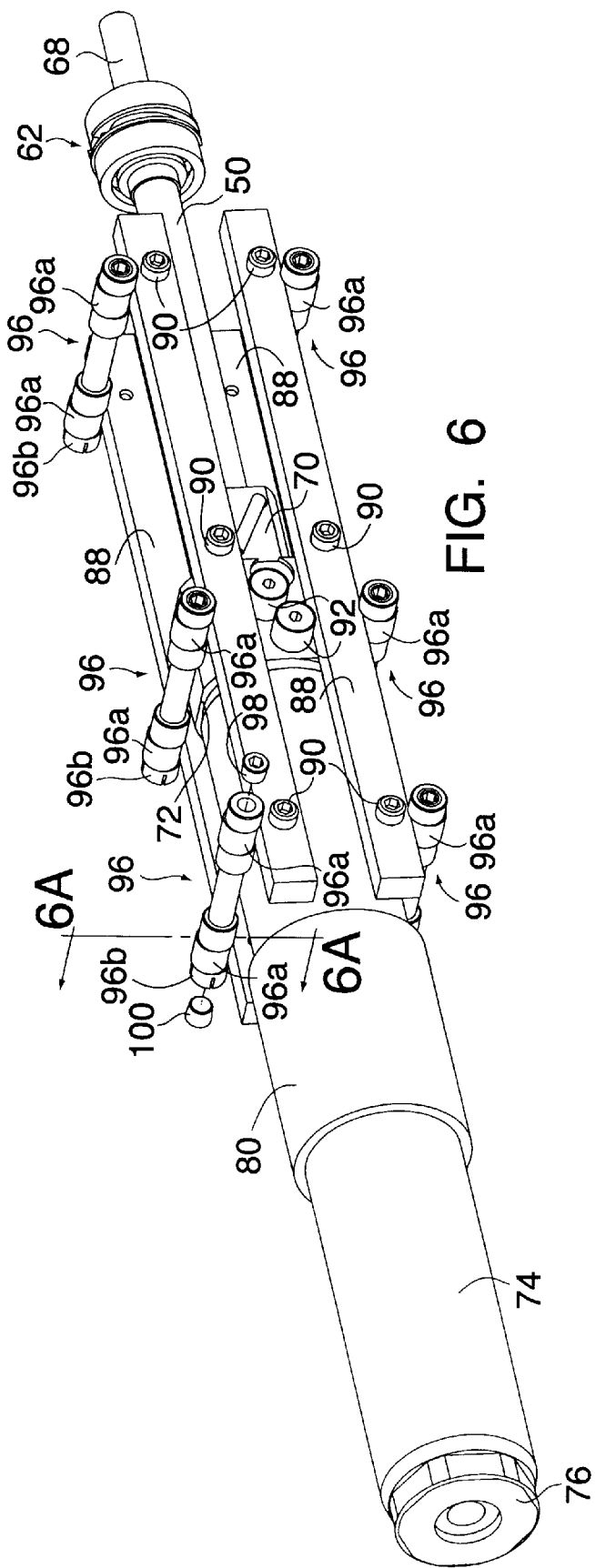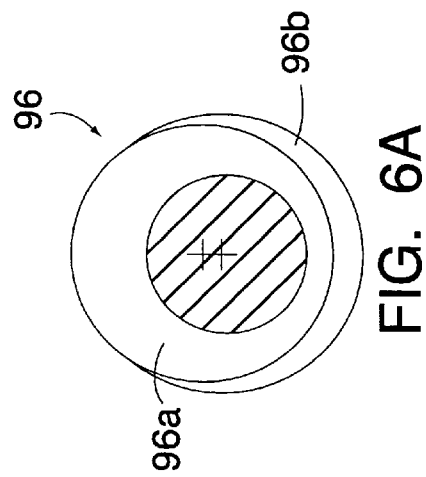

SIDE LOAD COMPENSATED LINEAR ACTUATOR

BACKGROUND OF THE INVENTION

1. Technical Field

The present invention relates generally to a device that can provide a side load capability which can be added or designed into any linear actuator/guide system, within the original physical envelope, to prevent undesired loading and excessive friction from being transmitted to the axial drive mechanism of the actuator system.

2. Background Art

A common linear actuator comprises a motive force—e.g., manual, electrical, pneumatic, hydraulic, etc.—driving a driver—e.g., ball screw and ball nut, pneumatic cylinder, hydraulic cylinder, etc.—which in turn positions an actuating member or piston. A conventional electromechanical linear actuator, comprising a motor driving a screw and nut assembly, is described in U.S. Pat. No. 4,500,805 to Swanson. A rotary mechanical motion transmission means is operated in unison with the motor. An elongated housing has one end in communication with the motion transmission means and an opposite end portion remote therefrom. An actuator assembly telescopically received within the housing at its opposite end portion is movable linearly relative thereto in one and an opposite direction for projection from the opposite end portion of the housing in varying degree.

Presently, linear actuators can be adapted for an almost unlimited number of applications, including pick and place operations involving substantial weight, part transfer, tool positioning, and lifting. In normal operation, the actuator assembly can be provided with a load and thereafter be extended and retracted. In such operation, the assembly may be subjected to bending moments in the form of forces cantilevered from the actuator mounting plate, forces "off-center" in the plane normal to axial motion, forces in planes that are parallel and/or offset to the axis of the actuator, and combinations thereof. Such bending moments lead to binding and/or side loading which causes wear and deformation of parts, and may lead to accelerated malfunction of the actuator.

Moreover, the bending moments to which an actuator is subjected vary relative to the extension position of the actuating or telescoping member, further contributing to the wear of the actuator. The side load acting upon the actuating member increases exponentially as the member is extended. Additionally, the side load acting upon the actuating member magnifies as the load magnitude increases.

Accordingly, linear actuators must be adapted to handle side load and corresponding bending moments, as well as withstand high pressure-velocities created by the movement of the actuating member. Traditionally, attempts have been made to isolate linear actuators, along with their main driver mechanisms, from bending moments. One solution to compensate for bending moments, is to provide a linear actuator with an external counterbalance/counterweight system or, alternatively, to provide an external auxiliary guide and support system. However, such external systems for actuators have not been wholly satisfactory because they significantly increase the size of the overall envelope by adding external components to an existing actuator.

Additionally, traditional counterbalances and counterweights that provide either a constant or a linear progressive force create excessive loading and wear in situations where the actual bending moments are less than the maximum bending moments expected. Thus, an external side load compensation device may subject a linear actuator to binding even if the load is removed and the actuating member is in a relatively retracted position.

The absence of a counterbalance system limits the length of the actuating member, and therefore the extent to which the member may be extended in use. This is because binding or excessive friction will occur in a plain or journal bearing design whenever the moment arm length exceeds twice the distance between the axial support bearings of the actuating member, regardless of the load magnitude. The work envelope must therefore be expanded in order to accommodate external guide systems which can increase side load capacity as well as extension length. However, increasing the size of the external guide system to accommodate actuating member extension also increases the load for the motor to handle, thus again accelerating wear and possibly malfunction of the motor.

It is the general object of the present invention to provide a side load compensation mechanism which avoids the drawbacks of the known art while enabling the linear actuator to perform its traditional axial tension and compression (i.e., extension and retraction) functions without encumbrance from simultaneous bending loads.

A further object of the present invention is to provide a side load compensated linear actuator which applies and resists axial forces and supports substantial bending moments without expanding the conventional linear actuator physical envelope.

Still another object of the present invention is to provide a unique, fixed or adjustable internal, pre-loaded, nonlinear cam mechanism which may be incorporated in any linear actuator regardless of motive power.

SUMMARY OF THE INVENTION

In accordance with the present invention and in fulfillment of the foregoing objects, a linear actuator is internally provided with one or more cam beams pre-loaded or preformed to shape and form (or deform) to a profile which applies an appropriate reactive force with a magnitude suited to both the degree of extension of the actuator and the load being handled by the actuator. One or more cam rollers is internally affixed to the primary driver and rides a cam beam during actuation, thereby effecting the necessary compensation to negate the influence of the bending moments by transferring the induced bending moments to the reactive force provided by the cam beams. Also, eccentric pre-load bars extend horizontally within the actuator housing and are adjusted by sockets to effect different pre-loads along the length of the cam beams to provide side load compensation for the bending moments, as well as torque counter-reaction forces to compensate for "off-center" forces.

An important advantage of the present invention is that it compensates for side loads and bending moments without increasing the physical envelope of the actuator, allowing for a compact actuator design.

Another advantage of the present invention is that side load compensation can be varied along the length of the actuator housing in a manner appropriate to both the expected load and the extended position of the actuating member, and due to the internal, nonlinear design of the present invention, an actuator adjusted to handle a maximum expected load will not experience binding if the load is removed. The side load compensation can also be adjusted in the field to accommodate varying loads is required.

Yet another advantage of the present invention is the simplicity of its design, allowing for a further advantage of adaptability to any linear actuator or guide system regardless of motive power.

The foregoing and other objects and advantages of the present invention will become more apparent in light of the following detailed description of the preferred embodiment thereof, as illustrated in the accompanying drawings.

BRIEF DESCRIPTION OF THE DRAWINGS

FIG. 6 is a perspective view of the side load compensation device of the present invention with respect to the structural components of a typical linear actuator with the actuator housing removed, with FIG. 6A showing the eccentric nature of a pre-load bar of the present invention along view 6A—6A.

DESCRIPTION OF THE PREFERRED EMBODIMENT

A preferred embodiment incorporating the present invention in an electromechanical linear actuator will now be described in detail with reference to FIGS. 1–5.

Figure 1:
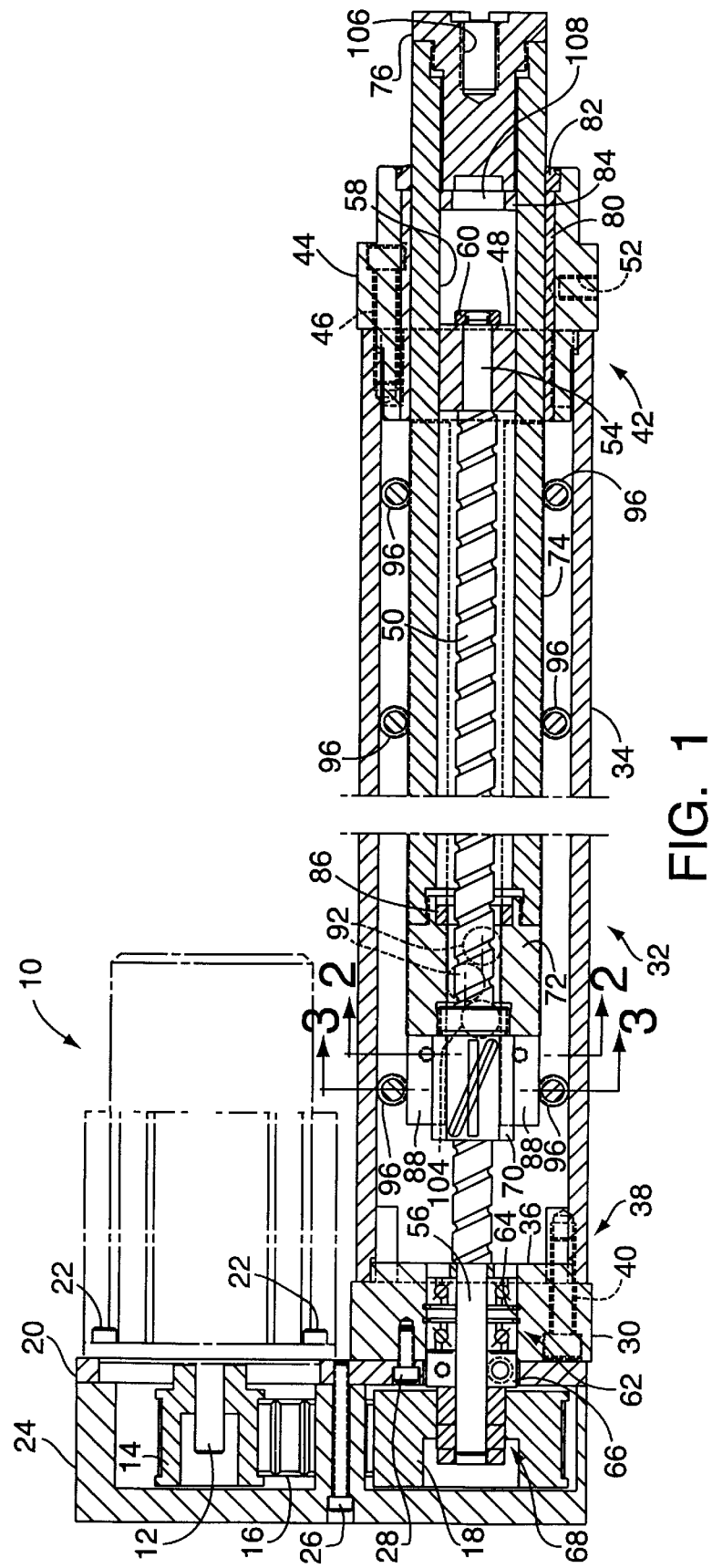
FIG. 1 is a longitudinal sectional view showing the improved linear actuator of the present invention.

Referring to FIG. 1, a linear actuator is provided with an A.C. or D.C. electric motor indicated generally at 10. The motor 10 is adapted for connection with a source of electrical power and has a rotary mechanical output element or shaft 12. The shaft 12 is connectable with a rotary mechanical motion transmission means in the form of a cog pulley 14 with a cog belt 16 engaged thereover and a second cog pulley 18 driven by the belt 16. The motor 10 may be mounted on a plate 20 as by means of bolts 22, 22.

A housing member 24 encloses the rotary transmission means in cooperation with the plate 20 by means of bolts 26, 26, one shown. The plate 20 may also be attached, as by means of bolts 28, 28, one shown, to a first or rear end cap 30 forming a part of actuator housing 32. The housing 32 may vary widely in form but preferably comprises an elongated hollow member 34 with a rectangular cross-section and which receives the inner end portion 36 of the rear end cap 30 at the lefthand or rear end portion 38 thereof by means of bolts 40, 40, one shown.

As shown in FIG. 1, housing 32 extends rightwardly from the rear end cap 30 to an opposite righthand or front end portion 42 and to a second or front end cap or closure member 44. The front end cap 44 is secured to the housing by means of bolts 46, 46, one shown. The front end cap 44 mounts a front bearing assembly 48 for a lead screw 50.

Rear end cap 30 and front end cap 44 are provided with a plurality of mounting bores 52 for mounting the actuator within a work station.

Lead screw 50 is elongated and is preferably of the ball type with reduced diameter front and rear end portions 54 and 56. The reduced front end portion 54 is journaled in bearing assembly 48 in turn mounted in a central opening 58 in the front end cap 44. A retaining nut 60 is provided to secure the lead screw 50 in the bearing assembly 48 and prevent axial movement of lead screw 50. The reduced diameter rear end portion 56 of the lead screw 50 is journaled in a bearing assembly 62 mounted in a central opening 64 in the rear end cap 30. A retaining device 66 cooperates with reduced rear end portion 56 of the lead screw 50 to secure the screw and bearing assembly 62 in position.

The aforementioned second cog pulley 18 is fixed to a rear end drive shaft assembly 68 of the lead screw 50. The lead screw 50 is thus rotated by the rotary transmission means on rotation of the motor shaft 12. With the lead screw 50 restrained against axial movement by retaining nut 60 and retaining device 66, the rotation of the screw 50 moves a complimentary drive nut 70 axially therealong.

Drive nut 70 is preferably of the ball type and is mounted on and about the lead screw 50 for movement axially therealong in one and an opposite direction on rotation of the lead screw 50 in one and an opposite direction. Operatively associated with the drive nut 70 is a rear drive member or drive nut adapter 72 which may be engaged with the nut 70 for axial movement therewith and which serves to support the rear end portion of an actuating member or piston 74. The drive nut adapter 72 may be threadedly engaged with the rear end portion of the actuating member 74.

Preferably, the actuating member 74 comprises an elongated housing provided with an actuating head or effector 76 at the front end portion of the actuating member 74. The actuating member 74 may vary in form but preferably comprises a hollow cylindrical member. The actuating head 76 may be similarly cylindrical and may be threadedly engaged with the front end portion of the actuating member 74. The drive nut adapter 72 may be a generally cylindrical form with flattened sides 78, 78 as is best illustrated in FIGS. 2 and 3.

At an opposite or front end portion, the actuating member 74 is cradled in a journal bearing or bushing 80 which in turn is supported in and affixed to the aforementioned front end cap 44. The actuating member 74 is telescopically received within the actuator housing 32 and slides axially through bushing 80 and an opening in the front end cap 44, so as to be firmly supported and guided for a relatively long axial extension of the actuating member 74. Bushing 80 allows the actuator to handle high pressure-velocities. Preferably, bushing 80 is a plane bearing; however, bushing 80 may be a roller bearing or any other bearing design that maintains a balance between an applied load and an internal compensation pre-load so as to reduce bending moments and friction in the actuator. An annular seal 82 is provided in the opening in the front end cap 44.

Annular seal 82 and bushing 80 prevent entry of dirt and particles into housing 32. An energy absorbing material or bumper is provided at 84 and 86. Bumpers 84 and 86 prevent jamming and helps protect the actuating member 74 from end of travel damage.

Figure 2:
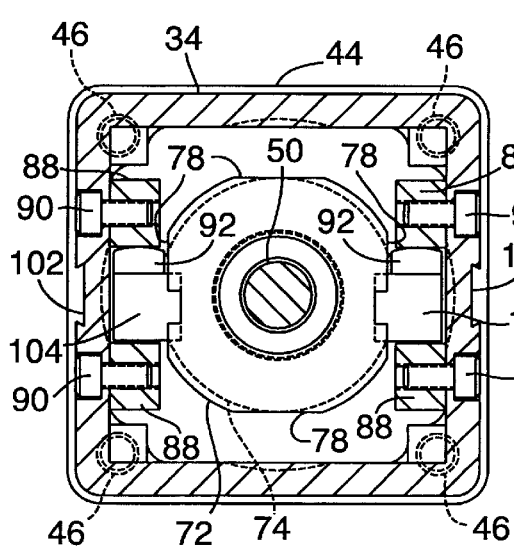
FIG. 2 is a transverse section taken through FIG. 1 as indicated generally at 2—2 in FIG. 1.
Figure 3:
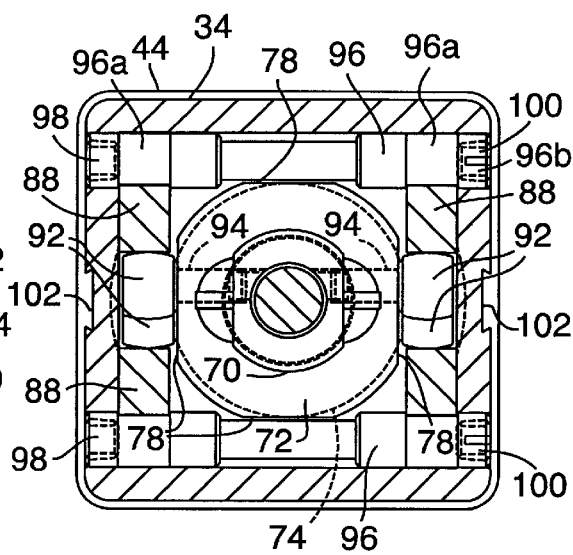
FIG. 3 is a further transverse section taken through FIG. 1 as indicated generally at 3—3 in FIG. 1.
Figure 4:
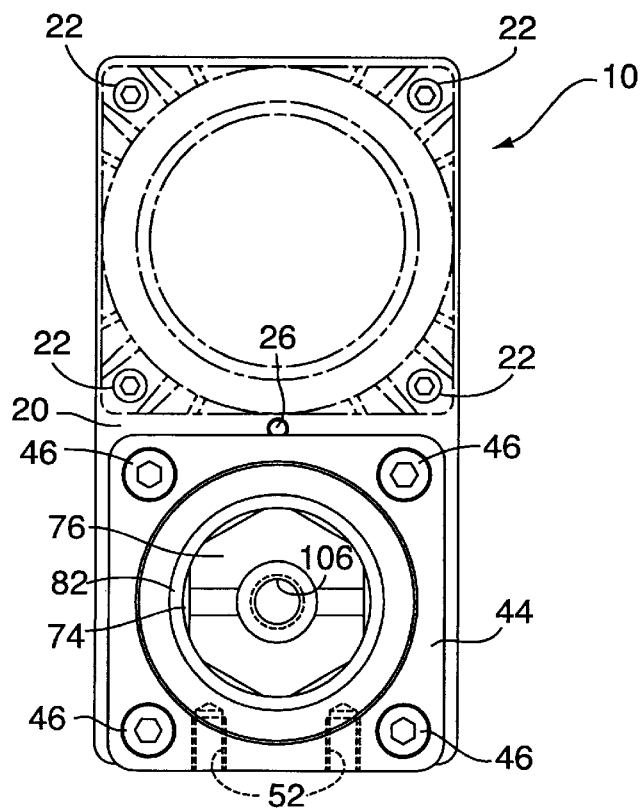
FIG. 4 is an end view of the improved linear actuator.
Figure 5:
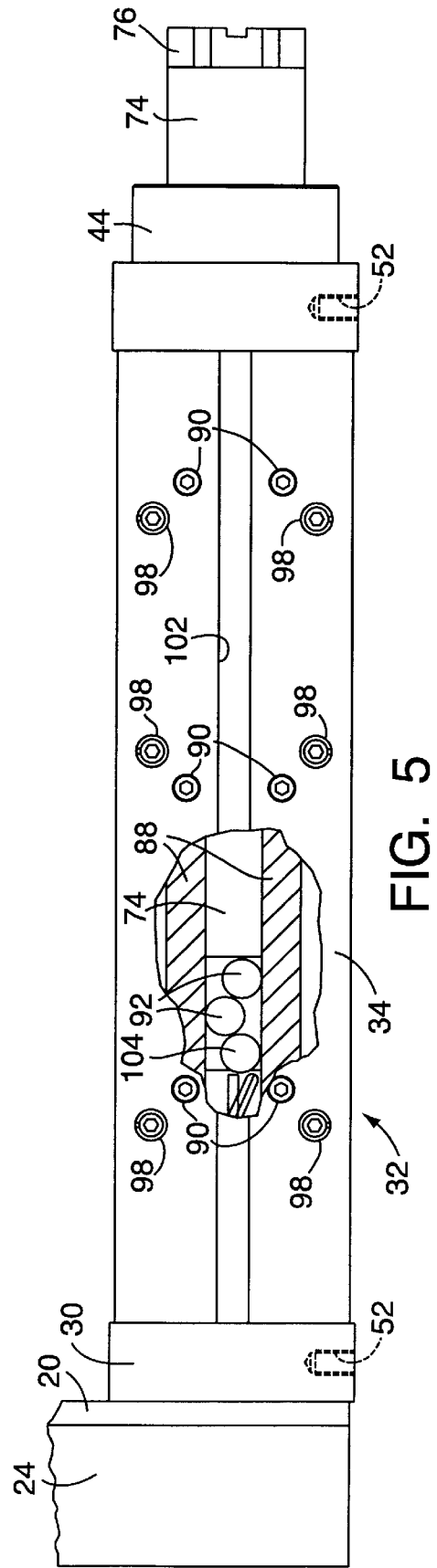
FIG. 5 is a side view of the improved linear actuator with a cut-away view of the side load compensation mechanism.

Referring to FIG. 2, pre-loaded cam beams or rails 88, 88 are attached to the housing 32 by means of bolts 90, 90. The cam beams 88 are approximately parallel to the axial direction of the lead screw 50. Preferably, the cam beams 88 extend at least the length of the interior of the housing 32 adjacent to the movement path of the drive nut adapter 72, as depicted in FIG. 1 primarily by hidden lines. The aforementioned drive nut 70 is provided with one or more cam rollers 92 (e.g., needle bearings). A cam roller 92 is affixed to a flat face 78 of the drive nut adapter 72 by means of shaft 94.

Preferably, the cam rollers 92 are provided in pairs arranged on diametrically opposite sides of the drive nut adapter 72 with the axis of the drive nut adapter 72 therebetween. Also, with reference to FIG. 5, multiple cam rollers 92 are preferably provided in a row along the axial movement direction of the drive nut 70 and the actuating member 74, and are offset in order to ensure movement of actuating member 74.

Referring to FIG. 3, with further reference to FIGS. 6 and 6A, eccentric, pre-load bars 96 are provided within the housing 32 perpendicularly adjacent to the cam beams 88. Eccentric pre-load bar 96 may be adjusted to form (or deform) cam beams 88 to a profile by effecting different pre-loads along the length of cam beams 88 by rotating eccentric pre-load bar 96 by means of, preferably, a hollow hex socket 98 in combination with tapered locking plug 100. Normally, plug 100 is loosened to allow eccentric pre-load bar 96 to be rotated, thereby deforming the cam beams 88 to the desired profile/pre-load amount. FIG. 6A shows the eccentric portion 96a of the pre-load bar 96 which effects the degree or amount of pre-load exerted on the cam beam 88 as the pre-load bar 96 is rotated. Eccentric portion 96a is preferably situated adjacent the cam beam 88. Because of the eccentric nature of eccentric portion 96a—i.e., having a distinct central axis from the rotary axis of the pre-load bar 96—the cam beam is either stressed or relaxed with relation to the amount of rotation of the pre-load bar 96. Once the pre-load is adjusted to a desired amount, plug 100 is tightened to lock pre-load bar 96 in place. Preferably, tapered locking plug 100 threads into the split end 96b of the pre-load bar 96 and expands the diameter of said split end 96b so as to lock the pre-load bar 96 into position without further rotation. The pre-load is transferred from the pre-load bar 96 to cam beam 88 at a location adjacent to the pre-load bar 96.

Pre-load bars 96 may be placed at multiple positions along the longitudinal length of housing 32. Strategic placement of the pre-load bars 96 allows for accurate side load compensation with respect to the extension length of the actuating member 74, and also facilitates maintaining appropriate torque counter-reaction forces to prevent warping of the actuating member 74. In a preferred embodiment, as shown in FIGS. 1 and 6, the pre-load bars 96 are arranged in three pairs. For each pair, one pre-load bar 96 is located above the cam beams 88 and the drive assembly, while the other pre-load bar 96 is located below the cam beams 88 and the drive assembly.

Referring to FIGS. 2 and 3, the housing 32 is provided with a groove 102 on each side for mounting sensors and actuation switches to control actuation. A magnet 104 is provided in the drive nut adapter 72 adjacent to and behind the row of cam rollers 92 to influence the sensors mounted in groove 102.

In operation, a pre-load compensating force profile is calculated with respect to the measured or expected bending moments or side load occurring in a particular application of the actuator. The compensating force profile may be set either in the factory or in the field. Typically, a load is applied to the actuating member 74. The actuating member 74 is extended to a set position and the bending moments calculated. A compensation force profile is thus determined with the actuating member 74 located at a number of extended positions. Preferably, the compensation force is applied to the actuator by rotating sockets 98 which in turn adjust pre-load bars 96 which in turn act upon and provide a pre-load to cam beams 88. The cam beams 88 are thereafter pre-loaded to shape and form to the compensating force profile which applies a reactive force in the direction of and with a magnitude suited to the degree of extension of the actuating member 74. The cam rollers 92 ride the cam beams 88 during actuator operation to effect the necessary side load compensation by transferring the induced bending moments to the reactive force provided by the cam beams 88.

In an alternate embodiment, the cam beams 88 may be pre-formed to the desired compensating force profile. This embodiment is preferable where the operations performed and the work load applied are the same, thereby obviating the need to adjust the compensating force profile with pre-load bars.

Ordinarily the loads acting upon the actuator vary relative to the extension position of actuating member 74. Accordingly, the pre-load compensation force should also vary relative to the extension position of the actuating member 74. Thus, pre-load bars 96 are preferably positioned along the length of the housing 32, as illustrated in FIG. 1, to effect different pre-loads along the length of the cam beams 88. Accordingly, each pre-load bar 96 may be adjusted to a different pre-load setting, giving the cam beam 88 a nonlinear compensating force profile proportional to the measured or expected bending moments. Additionally, the pre-load bars 96 located below the cam beams 88 and the actuating assembly are adjusted to compensate for radial lash created by torsional forces which may affect operation of the actuator. Journal bearing or bushing 80 is fixed in the front end cap 44 of the actuator to handle the summation of the load on the end of the actuating assembly and the compensation load provided by the pre-load bars 96 to the cam beams 88.

The actuator may be adapted for a number of applications, including, but not limited to pick and place operations, part transfer, height adjustment, lifting, inserting or removing a tool, robotics, etc. A threaded, registration diameter and key device 106 may also be provided in the actuating head 76 to support a load or receive tools adapted to desired operations. Device 106 can hold a side load onto the actuating assembly, keep the load aligned, prevent the load from turning torsionally or twisting, and prevent the load from moving or slipping from its position on actuating head 76. The actuating head 76 may also be provided with a gap 108 in its rear portion so as not to interfere with restraining nut 60 when the actuating member 74 is in its fully retracted position.

The above description merely provides an example of the presently preferred embodiment and should not be construed as limiting the scope of the invention. Generally, the cam rollers 92 can be affixed to the primary mover of any linear actuator regardless of the motive power—i.e., the primary mover of the actuator may be a ball screw/nut (as illustrated in FIG. 1), an acme screw/nut, a pneumatic cylinder, a hydraulic cylinder, etc. Thus, alternative embodiments may incorporate the side load compensation system of the present invention in all types of linear actuators or guide systems.

While the present invention has been illustrated and described with respect to a particular embodiment thereof, it should be appreciated by those of ordinary skill in the art that various modifications of the invention may be made without departing from its spirit and scope.

I claim:

1. A linear actuator comprising:
   a motive power source;
   an elongated housing having one end portion adjacent the power source and an opposite end portion remote therefrom;
   a driver disposed within the housing and driven by the power source for axial movement in one and an opposite direction within the housing;

an actuating member telescopically received within the housing and connected with and driven by the driver for external extension from the opposite end portion of the housing in varying degree; and an internal side load compensation device, comprising:

at least one cam beam affixed to the housing approximately parallel to the axial movement direction of the driver; and at least one cam roller affixed to the driver wherein the cam roller engages with the cam beam to effect compensation for side load.

2. The linear actuator in claim 1, wherein the internal side load compensation device further comprises at least one pre-load bar extending within the housing of the linear actuator essentially perpendicular to the cam beam and the axial movement direction of the driver, for effecting a pre-load on said cam beam.

3. The linear actuator in claim 1, wherein the internal side load compensation device further comprises a bearing affixed to the opposite end portion of the housing.

4. The linear actuator in claim 1, wherein the cam beam extends essentially the length of the housing.

5. The linear actuator in claim 1, further comprising an actuating head connected to the actuating member at the end portion thereof adjacent the opposite end portion of the housing.

6. The linear actuator in claim 5, wherein the actuating head is provided with a registration device for receiving a payload.

7. The linear actuator in claim 6, wherein the registration device comprises a threaded bore.

8. The linear actuator in claim 1, wherein the power source is an electric motor adapted for connection with a source of electrical power and having a rotary mechanical output element, further comprising:

rotary mechanical motion transmission means connectable with the electric motor output element and operated thereby and in unison therewith;

an elongated lead screw disposed within the housing in operative connection with and rotatably driven by the motion transmission means;

first and second bearing means in the housing for supporting the lead screw for rotation by the motion transmission means; and means for restraining the lead screw against axial movement relative to the bearing means and the housing.

9. The linear actuator in claim 8, wherein the driver is a drive nut operatively associated with and about the lead screw for axial movement in response to rotation of the screw.

10. The linear actuator in claim 9, wherein the lead screw and drive nut are of the ball type.

11. The linear actuator in claim 2, wherein the pre-load bar is adjustable.

12. The linear actuator in claim 11, wherein the pre-load bar eccentrically communicates with at least one socket and may be adjusted by effecting said socket.

13. An internal load compensation device, comprising:

at least one cam beam affixed to the interior of a linear actuator housing containing a driver mechanism, wherein said cam beam is approximately parallel to the axial movement direction of the linear actuator's driver mechanism;

at least one cam roller affixed to the driver mechanism wherein the cam roller engages with the cam beam to effect compensation for side load; and at least one pre-load bar extending within the housing of the linear actuator essentially perpendicular to the cam beam and the axial movement direction of the driver mechanism for effecting a pre-load on the cam beam.

14. The compensation device of claim 13, wherein three pre-load bars are disposed in the housing of the linear actuator above the driver mechanism and three pre-load bars are disposed in the housing of the linear actuator below the driver mechanism.

15. The compensation device of claim 13, further comprising a bearing affixed to an end portion of the housing.

16. The compensation device of claim 15, wherein the bearing is a journal bearing.

17. The compensation device of claim 13, wherein the pre-load bar is adjustable.

18. The compensation device of claim 17, wherein the pre-load bar eccentrically communicates with at least one socket and may be adjusted by effecting said socket.

19. The compensation device of claim 13, wherein the cam beam extends essentially the length of the housing.

* * * * *